United States Patent
Watson et al.

(10) Patent No.: US 9,039,352 B2
(45) Date of Patent: May 26, 2015

(54) SOUND ATTENUATING CHIMNEY ELEMENT FOR A TURBOMACHINE SYSTEM

(71) Applicant: General Electric Company, Schenectady, NY (US)

(72) Inventors: Eric Tracy Watson, Houston, TX (US); Joseph Gabriel Harris, Pearland, TX (US); Quoc Hoai Nguyen, Friendswood, TX (US); Yunyi Zou, Sugarland, TX (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 411 days.

(21) Appl. No.: 13/668,855

(22) Filed: Nov. 5, 2012

(65) Prior Publication Data

US 2014/0126997 A1    May 8, 2014

(51) Int. Cl.
| | |
|---|---|
| *F04D 29/66* | (2006.01) |
| *F01D 25/30* | (2006.01) |
| *F02C 7/24* | (2006.01) |
| *G10K 11/168* | (2006.01) |

(52) U.S. Cl.
CPC . *F01D 25/30* (2013.01); *F02C 7/24* (2013.01); *G10K 11/168* (2013.01); *F05D 2260/96* (2013.01)

(58) Field of Classification Search
CPC .... F05D 2260/96; F01D 25/30; G10K 11/168
USPC ......... 415/119; 60/728, 39.5, 39.511, 39.182; 431/114; 110/184; 126/500
See application file for complete search history.

(56) References Cited

U.S. PATENT DOCUMENTS

| | | | |
|---|---|---|---|
| 3,762,498 | A | 10/1973 | May et al. |
| 3,983,956 | A | 10/1976 | Manhart |
| 4,136,856 | A | 1/1979 | Murdock |
| 4,371,054 | A | 2/1983 | Wirt |
| 4,862,993 | A | 9/1989 | Rieger |
| 5,826,399 | A | 10/1998 | Dahl |
| 6,161,646 | A | 12/2000 | Curl |
| 6,705,428 | B2 | 3/2004 | Kudernatsch |
| 6,851,514 | B2 | 2/2005 | Han et al. |
| 7,766,731 | B2 | 8/2010 | Aschenbruck et al. |
| 2002/0011065 | A1 | 1/2002 | Nishimura et al. |
| 2003/0006090 | A1 | 1/2003 | Reed |
| 2010/0078260 | A1 | 4/2010 | McNeal, Jr. |
| 2012/0175889 | A1* | 7/2012 | Iijima et al. ................. 290/1 R |

FOREIGN PATENT DOCUMENTS

| | | |
|---|---|---|
| WO | 03014631 A1 | 2/2003 |
| WO | 03056149 A1 | 7/2003 |

OTHER PUBLICATIONS

GB Search and Examination Report issued Jun. 11, 2014 in connection with corresponding GB Patent Application No. GB1319449.3.

* cited by examiner

*Primary Examiner* — Edward Look
*Assistant Examiner* — Jason Mikus
(74) *Attorney, Agent, or Firm* — Cantor Colburn LLP

(57) ABSTRACT

A sound attenuating chimney element for a turbomachine system includes a high density outer body having an external surface and an internal surface, and one or more acoustic attenuation layers provided on the external surface of the outer body. The one or more acoustic attenuation layers include an outer surface portion and an inner surface portion. A structural layer is provided on the outer surface portion of the one or more acoustic attenuation layers. The structural layer includes an external surface that defines a duct configured and disposed to pass gases from the turbomachine system.

19 Claims, 4 Drawing Sheets

SOUND ATTENUATING CHIMNEY ELEMENT FOR A TURBOMACHINE SYSTEM

BACKGROUND OF THE INVENTION

The subject matter disclosed herein relates to the art of turbomachines and, more particularly, to a sound attenuating chimney element for a turbomachine system.

Gas turbomachines include a compressor portion linked to a turbine portion through a common compressor/turbine shaft or rotor and a combustor assembly. The compressor portion guides compressed air flow through a number of sequential stages toward the combustor assembly. In the combustor assembly, the compressed air flow mixes with a fuel to form a combustible mixture. The combustible mixture is combusted in the combustor assembly to form hot gases. The hot gases are guided to the turbine portion through a transition piece. The hot gases expand through the turbine portion rotating turbine blades to create work that is output, for example, to power a generator, a pump, or to provide power to a vehicle. Often times, a portion of the compressed air is passed to an intercooler prior to being introduced to the turbine portion. Heated gases formed in the intercooler may flow to a chimney. The heated gases enter the chimney through a chimney stack base and flow through a chimney duct or flue and exit to atmosphere.

BRIEF DESCRIPTION OF THE INVENTION

According to one aspect of an exemplary embodiment, a sound attenuating chimney element for a turbomachine system includes a high density outer body having an external surface and an internal surface, and one or more acoustic attenuation layers provided on the external surface of the outer body. The one or more acoustic attenuation layers include an outer surface portion and an inner surface portion. A structural layer is provided on the outer surface portion of the one or more acoustic attenuation layers. The structural layer includes an external surface that defines a duct configured and disposed to pass gases from the turbomachine system.

According to another aspect of an exemplary embodiment, a turbomachine system includes a compressor portion, a turbine portion fluidically connected to the compressor portion, a fluid duct fluidically coupled to one of the compressor portion and the turbine portion, and a sound attenuating chimney element mechanically linked to the fluid duct. The sound attenuating chimney element includes a high density outer body including an external surface and an internal surface, and one or more acoustic attenuation layers provided on the external surface of the outer body. The one or more acoustic attenuation layers include an outer surface portion and an inner surface portion. A structural layer is provided on the outer surface portion of the one or more acoustic attenuation layers. The structural layer includes an external surface that defines a duct configured and disposed to pass gases from the turbomachine system.

These and other advantages and features will become more apparent from the following description taken in conjunction with the drawings.

BRIEF DESCRIPTION OF DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
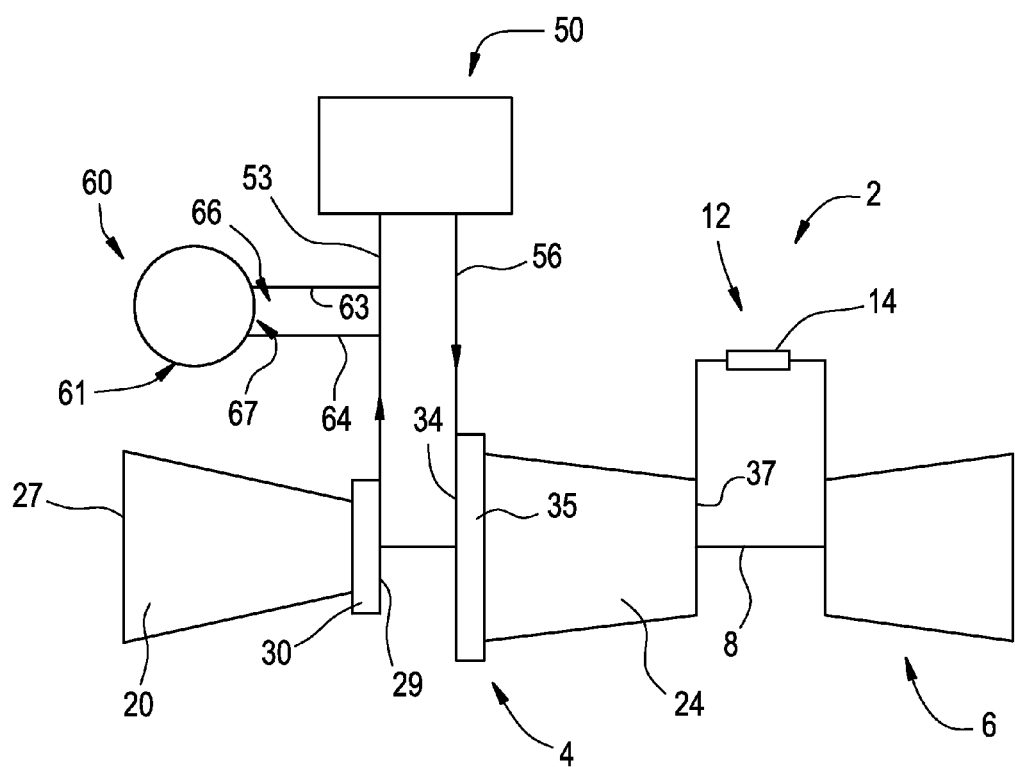
FIG. 1 is a schematic view of a turbomachine system including a chimney stack base in accordance with an exemplary embodiment.

With reference to FIG. 1 a turbomachine system, in accordance with an exemplary embodiment, is indicated generally at 2. Turbomachine system 2 includes a compressor portion 4 operatively connected to a turbine portion 6 through a common compressor/turbine shaft 8. Compressor portion 4 is also fluidly connected to turbine portion 6 through a combustor assembly 12. Combustor assembly 12 includes one or more circumferentially spaced combustors 14 arranged in a can-annular array. Of course it should be understood that combustor assembly 12 may also include other combustor arrangements. Combustor 14 is fluidically connected to turbine portion 6 through a transition piece (not shown).

In the exemplary embodiment shown, compressor portion 4 includes a first or booster compressor 20 and a second or high pressure compressor 24. Booster compressor 20 includes an inlet 27 and an outlet 29. Outlet 29 is provided with an outlet booster scroll 30. High pressure compressor 24 includes an inlet 34 fluidically connected to outlet 29. Inlet 34 includes a high-pressure compressor inlet scroll 35. High pressure compressor 24 also includes an outlet 37 that is fluidically connected to combustor 14 and turbine portion 6. Turbomachine system 2 is also shown to include an intercooler 50 connected between booster compressor 20 and high pressure compressor 24. Intercooler 50 may take the form of a wet intercooler or a dry intercooler. Regardless of type, intercooler 50 includes an inlet fluid duct 53 fluidically connected to outlet booster scroll 30 and an outlet fluid duct 56 fluidically connected to high pressure compressor inlet scroll 35. Inlet fluid duct 53 is also fluidically connected to a sound attenuating chimney element 60. In the exemplary embodiment shown, sound attenuating chimney element 60 takes the form of a chimney stack base 61. Inlet fluid duct 53 is fluidically connected to chimney stack base 61 through first and second chimney inlets 63 and 64. Each chimney inlet 63 and 64 includes a corresponding valve 66 and 67 that controls fluid flow into chimney stack base 61.

With this arrangement, air from compressor portion 4 is mixed with fuel to form a combustible mixture. The combustible mixture is combusted within a combustor 14 forming hot gases. The hot gases flow from combustor 14 to a first stage (not shown) of turbine portion 6. Compressor gases flow from booster compressor 20 into high pressure compressor 24 prior to reaching combustor assembly 12 and turbine portion 6. Prior to passing into high pressure compressor 24, a portion of the compressor gases pass from outlet booster scroll 30 into intercooler 50. In intercooler 50, heat is extracted from the compressor air to form a lower temperature airstream having a relatively constant pressure. The intercooler airstream may pass back into the high pressure compressor inlet scroll 35 and into high pressure compressor 24. Alternatively, a portion of the compressor airstream passing through inlet fluid duct 53 may be directed to chimney stack base 61 through operation of one, the other, or both valves 66 and 67.

Figure 2:
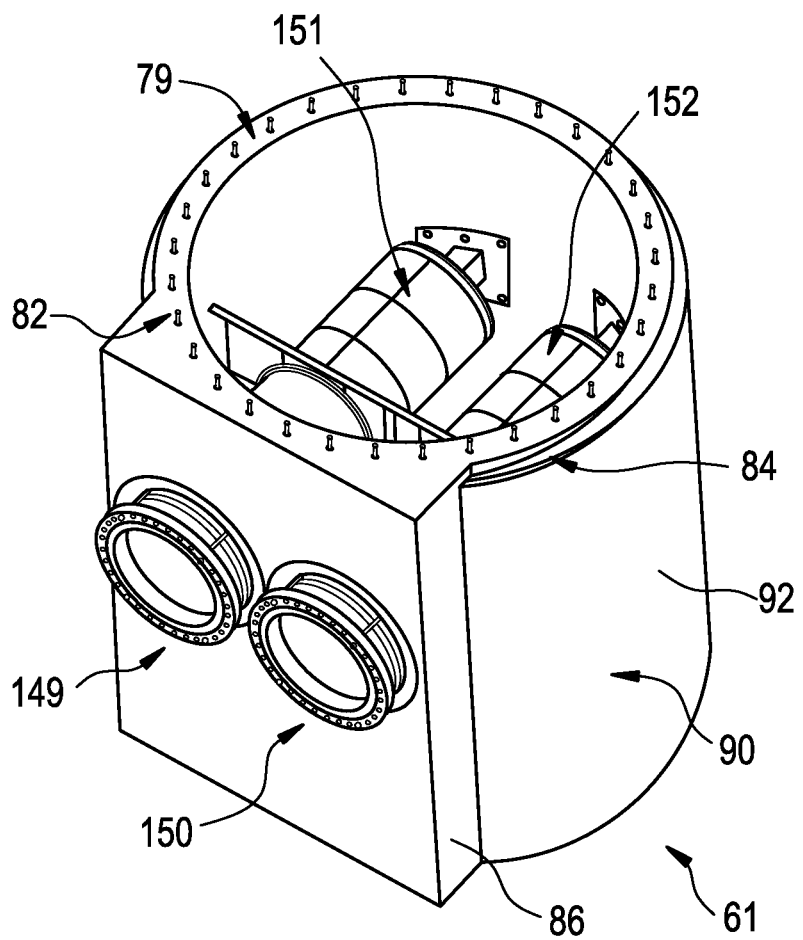
FIG. 2 is an upper perspective view of the chimney stack base of FIG. 1.

As shown in FIG. 2, chimney stack base 61 includes an upper edge 79 provided with a plurality of fasteners, shown in the form of threaded rods 82. Upper edge 79 extends across a rain cap 84 that limits rainfall from entering chimney stack base 61. A connection zone 86 is provided on chimney stack base 61 and connected with upper edge 79. In accordance with an aspect of the exemplary embodiment, upper edge 79 and connection zone 86 are formed from reinforced concrete. As will be discussed more fully below, chimney stack base 61 is constructed from materials that limit noise generated by incoming fluid from passing to surrounding areas.

Figure 3:
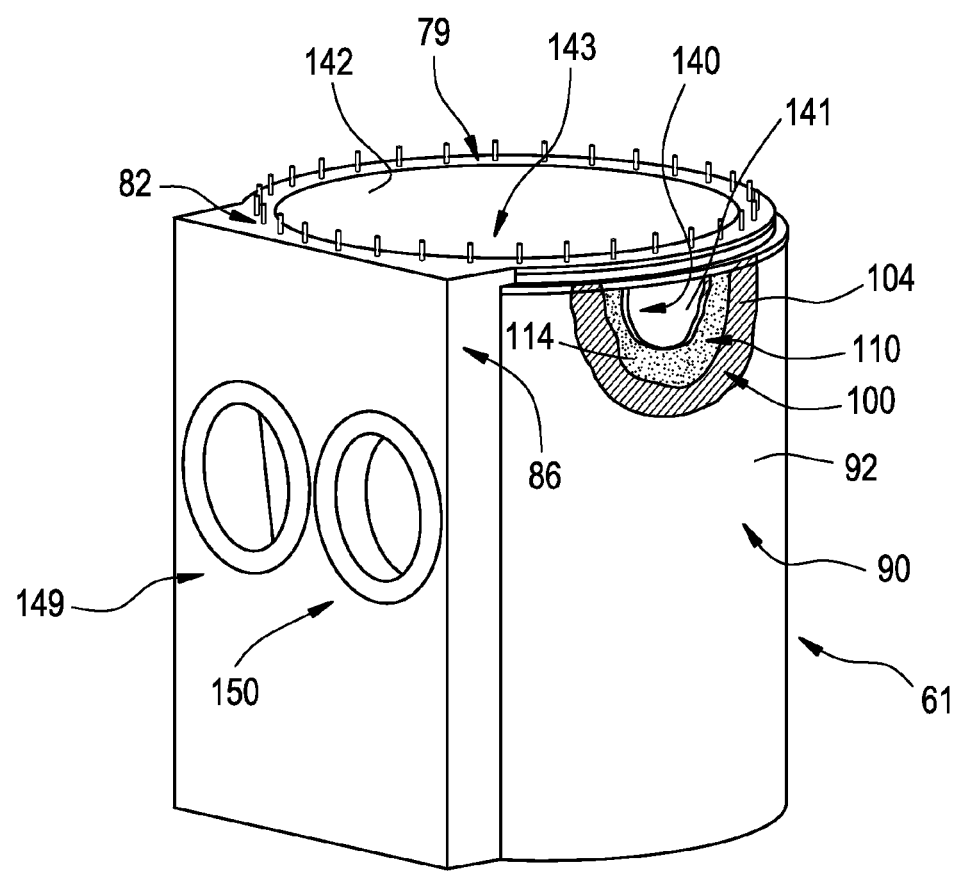
FIG. 3 is a partially cut-away view of the chimney stack base of FIG. 2.
Figure 4:
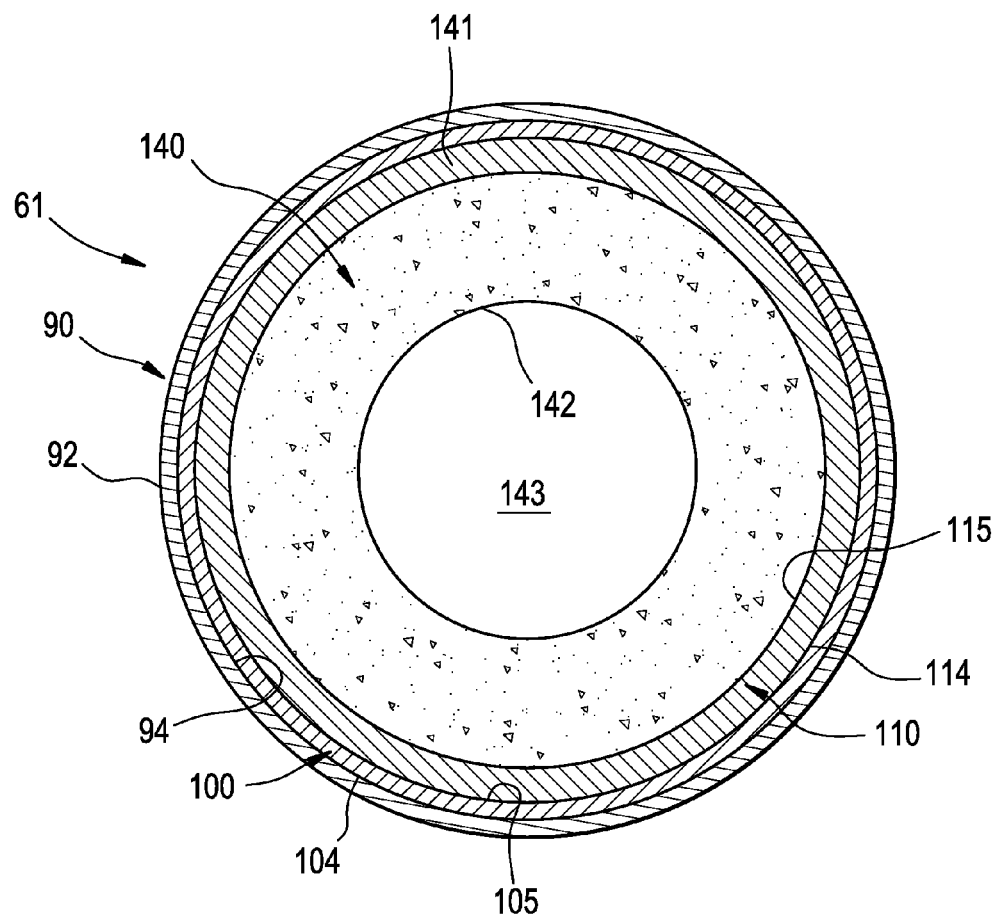
FIG. 4 is a cross-sectional view of the chimney stack base of FIG. 3.

As shown in FIGS. 3 and 4, chimney stack base 61 includes a high density outer body 90 including an external surface 92 and an internal surface 94. High density outer body 90 is formed, in accordance with an aspect of the exemplary embodiment, from a highly reflective acoustic material such as steel. In addition to providing sound attenuation properties, high density outer body provides structural support for other chimney elements. In accordance with another aspect of the exemplary embodiment, high density outer body 90 is formed from 16-gauge carbon steel. Chimney stack base 61 also includes first acoustic attenuation layer 100. The term "acoustic attenuation layer" should be understood to imply a layer formed from an acoustically absorptive material having relatively low stiffness or rigidity. First acoustic attenuation layer 100 includes a first outer surface portion 104 and a first inner surface portion 105. First outer surface portion 104 abuts internal surface 94. First outer surface portion 104 may be bonded to internal surface 94. In accordance with an exemplary embodiment, first acoustic attenuation layer 100 is formed from a generally pliable material or soft fiber material. In accordance with an aspect of the exemplary embodiment, the generally pliable material includes a fiber blanket. The particular type of fiber blanket can vary. Further other pliable acoustic attenuation material may also be employed.

Chimney stack base 61 also includes a second acoustic attenuation layer 110. Second acoustic attenuation layer 110 includes a second outer surface portion 114 and a second inner surface portion 115. Second outer surface portion 114 abuts first inner surface portion 105. Second outer surface portion 114 may be bonded to first inner surface portion 105. In accordance with an exemplary embodiment, second acoustic attenuation layer 110 is formed from a generally rigid material or hard fiber material. In accordance with an aspect of the exemplary embodiment, the generally rigid material includes fiber board. Of course it should be understood that other rigid acoustic attenuation materials may also be employed. Chimney stack base 61 is further shown to include a structural layer 140.

In accordance with an aspect of the exemplary embodiment, structural layer 140 is formed from reinforced concrete material capable of withstanding temperatures of fluids having an operating range between about −39° F. (−39.44° C.) and 572° F. (300° C.). Thus, structural layer 140 in addition to providing support, also provides thermal resistance. Structural layer 140 includes an external surface section 141 bonded to second inner surface portion 115, and an internal surface section 142 that defines a duct 143. Duct 143 carries fluid introduced through first and second chimney inlets 63 and 64 to a chimney stack (not shown). First and second openings 149 and 150 extend through chimney stack base 61 to duct 143. First and second openings 149 and 150 support corresponding first and second diffusers 151 and 152 that condition the fluid passing into duct 143.

Figure 5:
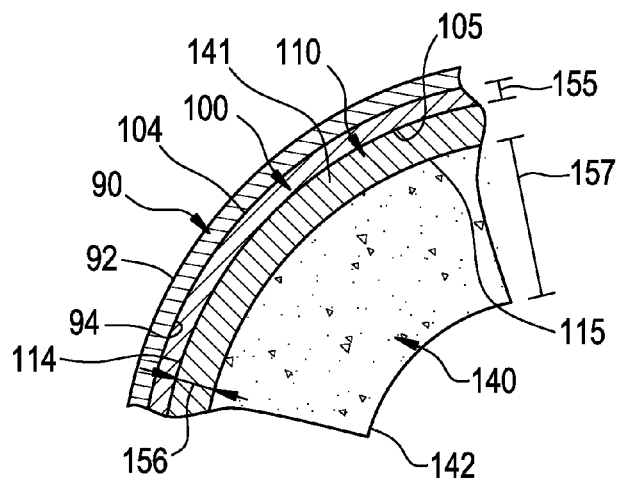
FIG. 5 depicts a section of the cross-sectional view of FIG. 4.

As shown in FIG. 5, first acoustic attenuation layer 100 includes a first thickness 155, second acoustic attenuation layer 110 includes a second thickness 156, and structural layer 140 includes a third thickness 157. In accordance with an exemplary embodiment, second thickness 156 is about two times the first thickness 155. Third thickness 157 is about four times the second thickness 156. Of course it should be understood that the ratios between the thicknesses may vary. The multiple layers of high density material, pliable material, rigid material and thermal resistance material provides a desired acoustic attenuation that limits noise emanating from chimney stack base 61. For example, in accordance with an aspect of the exemplary embodiment, acoustic attenuation (Sound Transmission Loss) of about 40 dB or more has been realized for frequencies below 50 Hz and above 200 Hz, and an attenuation of about 30 dB or more has been realized for generated noise within the frequency band between 50 Hz and about 200 Hz. Sound attenuation above 250 Hz exceeds 50 dB, above 630 Hz exceeds 60 dB and above 1600 Hz exceeds 70 dB. At this point it should be understood that while described in terms of a chimney stack base, the sound attenuating chimney element in accordance with the exemplary embodiment may include any portion of a chimney between the chimney stack base and a chimney outlet.

While the invention has been described in detail in connection with only a limited number of embodiments, it should be readily understood that the invention is not limited to such disclosed embodiments. Rather, the invention can be modified to incorporate any number of combinations, variations, alterations, material substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A sound attenuating chimney element for a turbomachine system comprising:
   a high density outer body including an external surface and an internal surface;
   one or more acoustic attenuation layers provided on the internal surface of the high density outer body, the one or more acoustic attenuation layers including an outer surface portion and an inner surface portion; and
   a structural layer comprising concrete provided on the inner surface portion of the one or more acoustic attenuation layers, the structural layer including an internal surface section that defines a duct configured and disposed to pass exhaust gases from the turbomachine system.

2. The sound attenuating chimney element according to claim 1, wherein the high density outer body comprises steel.

3. The sound attenuating chimney element according to claim 2, wherein the steel comprises 16-gauge steel.

4. The sound attenuating chimney element according to claim 1, wherein the one or more acoustic attenuation layers include a first acoustic attenuation layer including a first inner surface portion and a first outer surface portion and a second acoustic attenuation layer including a second inner surface portion and a second outer surface portion, the second outer surface portion abutting the first inner surface portion.

5. The sound attenuating chimney element according to claim 4, wherein the first acoustic attenuation layer comprises a substantially pliable material.

6. The sound attenuating chimney element according to claim 5, wherein the substantially pliable material comprises a fiber-blanket.

7. The sound attenuating chimney element according to claim 4, wherein the second acoustic attenuation layer comprises a substantially rigid material.

8. The sound attenuating chimney element according to claim 7, wherein the substantially rigid material comprises fiber board.

9. The sound attenuating chimney element according to claim 4, wherein the first acoustic attenuation layer includes a first thickness and the second acoustic attenuation layer includes a second thickness, the second thickness being about twice the first thickness.

10. The sound attenuating chimney element according to claim 9, wherein the structural layer includes a third thickness, the third thickness being about four times the second thickness.

11. The sound attenuating chimney element according to claim 1, wherein the concrete comprises reinforced concrete.

12. The sound attenuating chimney element according to claim 1, wherein the sound attenuating chimney element comprises a sound attenuating chimney stack base including one or more openings extending through the high density outer body to the duct.

13. The sound attenuating chimney element according to claim 12, further comprising: one or more diffusers provided in respective ones of the one or more openings.

14. A turbomachine system comprising:
a compressor portion;
a turbine portion fluidically connected to the compressor portion;
a fluid duct fluidically coupled to one of the compressor portion and the turbine portion; and
a sound attenuating chimney element mechanically linked to the fluid duct, the sound attenuating chimney element comprising:
a high density outer body including an external surface and an internal surface;
one or more acoustic attenuation layers provided on the internal surface of the high density outer body, the one or more acoustic attenuation layers including an outer surface portion and an inner surface portion; and
a structural layer comprising concrete provided on the inner surface portion of the one or more acoustic attenuation layers the structural layer including an internal surface section that defines a duct configured and disposed to pass exhaust gases from the turbomachine system.

15. The turbomachine system according to claim 14, wherein the high density outer body comprises steel.

16. The turbomachine system according to claim 14, wherein the one or more acoustic attenuation layers include a first acoustic attenuation layer including a first inner surface portion and a first outer surface portion and a second acoustic attenuation layer including a second inner surface portion and a second outer surface portion, the second outer surface portion abutting the first inner surface portion.

17. The turbomachine system according to claim 16, wherein the first acoustic attenuation layer comprises a fiber-blanket and the second acoustic attenuation layer comprises a fiber board.

18. The turbomachine system according to claim 16, wherein the first acoustic attenuation layer includes a first thickness, the second acoustic attenuation layer includes a second thickness, and the structural layer includes a third thickness, the second thickness being about twice the first thickness and the third thickness being about four times the second thickness.

19. The turbomachine system according to claim 14, further comprising: an intercooler fluidically connected to the compressor portion, the intercooler being fluidically connected to the sound attenuating chimney element through the fluid duct.

* * * * *